US012699744B2

(12) United States Patent
Komaravolu et al.

(10) Patent No.: US 12,699,744 B2
(45) Date of Patent: Aug. 4, 2026

(54) SYSTEM AND METHOD FOR GEOHASHED DATA STORE QUERY

(71) Applicant: T-Mobile Innovations LLC, Overland Park, KS (US)

(72) Inventors: Kiran Kumar Komaravolu, Bellevue, WA (US); Gavin Pinchback, Olathe, KS (US); Vikas Ranjan, Bellevue, WA (US); Stephen Michael Shiflet, Rowlett, TX (US); Jason P. Smith, Plano, TX (US)

(73) Assignee: T-Mobile Innovations LLC

( * ) Notice: Subject to any disclaimer, the term of this patent is extended or adjusted under 35 U.S.C. 154(b) by 0 days.

(21) Appl. No.: 18/599,105

(22) Filed: Mar. 7, 2024

(65) Prior Publication Data

US 2025/0284753 A1     Sep. 11, 2025

(51) Int. Cl.
*G06F 16/9537* (2019.01)
*G06F 16/23* (2019.01)
*G06F 16/27* (2019.01)

(52) U.S. Cl.
CPC ...... *G06F 16/9537* (2019.01); *G06F 16/2379* (2019.01); *G06F 16/27* (2019.01); *G06F 16/278* (2019.01)

(58) Field of Classification Search
CPC ............. G06F 16/9537; G06F 16/2379; G06F 16/278; G06F 16/27
See application file for complete search history.

(56) References Cited

U.S. PATENT DOCUMENTS

2015/0215409 A1*  7/2015  Chow ................ G06Q 30/0259
                                                    455/456.3
2022/0300537 A1*  9/2022  Song ....................... G06F 16/22
                                (Continued)

FOREIGN PATENT DOCUMENTS

CN        111294742 A      6/2020
EP          4614345 A2     9/2025
WO      2024012737 A1      1/2024

OTHER PUBLICATIONS

Foreign Communication from a Related Counterpart Application, Partial European Search Report dated Jul. 14, 2025, European Application No. 25158864.6 filed Feb. 19, 2025.
(Continued)

*Primary Examiner* — Kavita Stanley
*Assistant Examiner* — Lin Lin M Htay

(57)     ABSTRACT

A method is disclosed for providing a database of subscriber interactions with a network. The database is configured for geographical searching. A provider record relating to a transaction between a network node and a subscriber is received. A first period provider records collection including provider records from a first predetermined time period is stored. The first period provider records collection is converted into a first period unified records collection. A second period unified records collection is stored having unified records from a second predetermined time period. The second predetermined time period is longer than the first predetermined time period. The second period unified records collection includes sub-period partitions with unified records having timestamps in a first time sub-period. Each sub-period partition includes geohash partitions with unified records having geohash values in a range of values, and each geohash partition includes subscriber partitions with unified records having a common subscriber ID.

20 Claims, 8 Drawing Sheets

(56) References Cited

U.S. PATENT DOCUMENTS

| | | | |
|---|---|---|---|
| 2023/0128788 A1* | 4/2023 | Millington | G01C 21/3605 |
| | | | 701/533 |
| 2023/0195816 A1* | 6/2023 | Davis | G06Q 50/40 |
| | | | 707/722 |

OTHER PUBLICATIONS

Tian, et al., "A Survey of Spatio-Temporal Big Data Indexing Methods in Distributed Environment", IEEE Journal of Selected Topics in Applied Earth Observations and Remote Sensing, vol. 15, Jan. 1, 2022, pp. 4132-4155, XP093225177, USA ISSN: 1939-1404, DOI: 10.1109/JSTARS.2022.3175657.
"Geohash—Wikipedia", Mar. 4, 2024, XP093290205, Retrieved from the Internet: URL:https://en.wikipedia.org/w/index.php?title=Geohash&oldid=1211820754.
"Call detail record—Wikipedia", Sep. 28, 2023, XP093290224, Retrieved from the Internet: URL:https://en.wikipedia.org/w/index.php?title=Call detail-record&oldid=1177588440.
Foreign Communication from a Related Counterpart Application, Extended European Search Report dated Oct. 7, 2025, European Application No. 25158864.6 filed Feb. 19, 2025.

\* cited by examiner

Figures 2A, 2B, 2C, 2D:
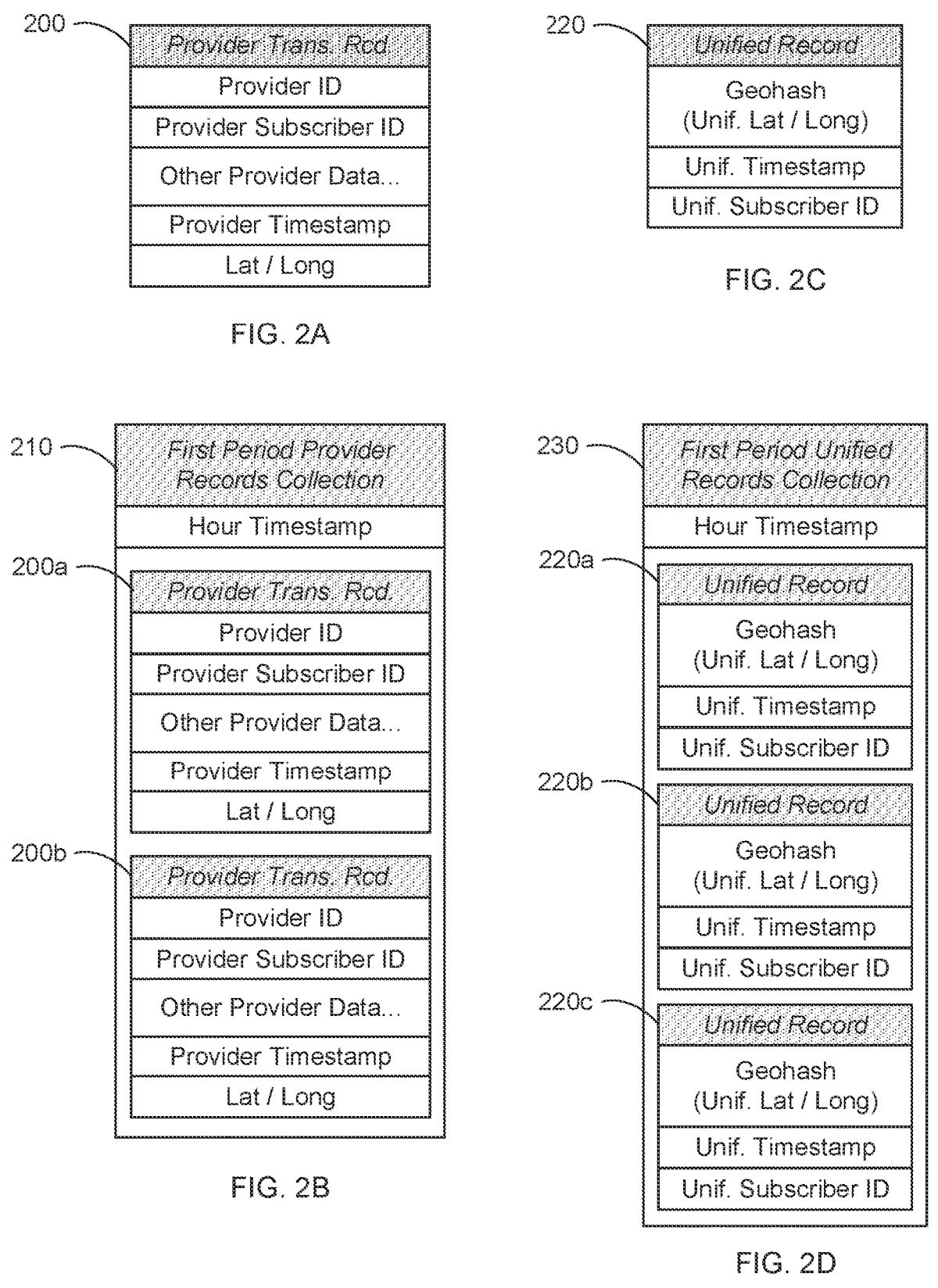

200

| Provider Trans. Rcd. |
| :---: |
| Provider ID |
| Provider Subscriber ID |
| Other Provider Data... |
| Provider Timestamp |
| Lat / Long |

| Unified Record |
| :---: |
| Geohash (Unif. Lat / Long) |
| Unif. Timestamp |
| Unif. Subscriber ID |

| First Period Provider Records Collection |
| :---: |
| Hour Timestamp |

200a

| Provider Trans. Rcd. |
| :---: |
| Provider ID |
| Provider Subscriber ID |
| Other Provider Data... |
| Provider Timestamp |
| Lat / Long |

200b

| Provider Trans. Rcd. |
| :---: |
| Provider ID |
| Provider Subscriber ID |
| Other Provider Data... |
| Provider Timestamp |
| Lat / Long |

| First Period Unified Records Collection |
| :---: |
| Hour Timestamp |

220a

| Unified Record |
| :---: |
| Geohash (Unif. Lat / Long) |
| Unif. Timestamp |
| Unif. Subscriber ID |

220b

| Unified Record |
| :---: |
| Geohash (Unif. Lat / Long) |
| Unif. Timestamp |
| Unif. Subscriber ID |

220c

| Unified Record |
| :---: |
| Geohash (Unif. Lat / Long) |
| Unif. Timestamp |
| Unif. Subscriber ID |

302
Receive a provider transaction record

304
Store a first period records collection comprising provider transaction records from a first predetermined time period 306
Convert the first period records collection into a unified records collection 308
Store a second period records collection comprising unified records

400

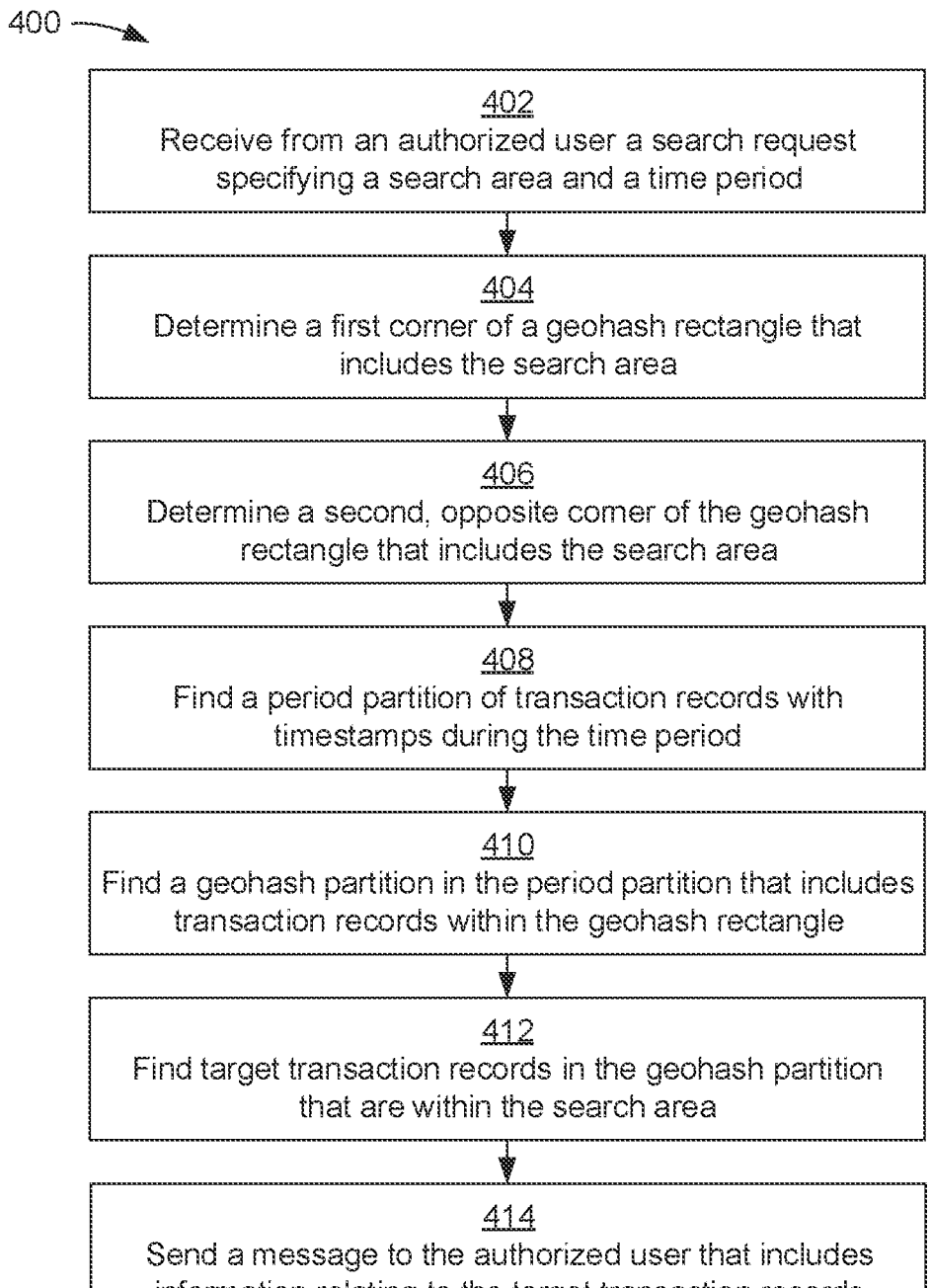

402
Receive from an authorized user a search request specifying a search area and a time period

404
Determine a first corner of a geohash rectangle that includes the search area

406
Determine a second, opposite corner of the geohash rectangle that includes the search area

408
Find a period partition of transaction records with timestamps during the time period

410
Find a geohash partition in the period partition that includes transaction records within the geohash rectangle

412
Find target transaction records in the geohash partition that are within the search area

414
Send a message to the authorized user that includes information relating to the target transaction records

FIG. 4

500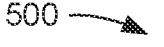

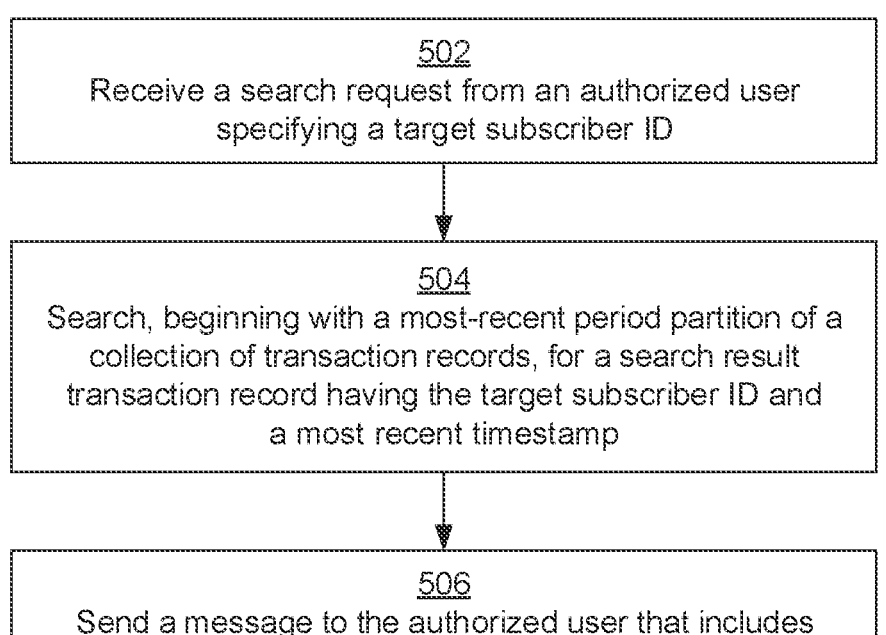

502
Receive a search request from an authorized user
specifying a target subscriber ID

504
Search, beginning with a most-recent period partition of a
collection of transaction records, for a search result
transaction record having the target subscriber ID and
a most recent timestamp

506
Send a message to the authorized user that includes
information relating to the search result transaction record

FIG. 5

SYSTEM AND METHOD FOR GEOHASHED DATA STORE QUERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A large amount of information is collected that relates to interactions between mobile devices and elements of a telecommunication network. Providers of such networks may include common carriers, broadband Internet access providers, and wireless Voice over Internet Protocol (VoIP) service providers. Such interaction information may include identifiers (IDs) of the mobile device and the provider involved in the interaction; a timestamp of the interaction; for cellular devices, the cell tower being used by the target phone; and a location of the mobile device relative to the cell tower. The mobile device ID may be converted into a subscriber ID and the location into a latitude and longitude (lat/long) value. The interaction information is collected by network providers from their cell towers or clusters of their cell towers.

SUMMARY

In an embodiment, a method for providing, in a server computer, a database of information relating to subscriber interactions with a telecommunication network, the database configured for geographical searching is disclosed. The method comprises receiving, by a server computer, a provider record that relates to a transaction between a node of a telecommunications network and a subscriber of the telecommunications network, the provider record comprising a timestamp, a subscriber identifier (ID), and geographical information relating to the transaction; storing, by the server computer, one or more provider records in a first period provider records collection, where the first period provider records collection comprises provider records having timestamps representing a time within a first predetermined time period; converting, by the server computer, the first period provider records collection into a first period unified records collection comprising unified records having a unified transaction record format, wherein each unified record comprises a geohash value, a unified timestamp, and a unified subscriber ID representing, respectively, the geographical information, the timestamp, and the subscriber ID of a corresponding provider record from the first period provider records collection; and storing, by the server computer, a second period unified records collection comprising unified records received during a second predetermined time period, wherein the second predetermined time period is longer than the first predetermined time period, wherein: the second period unified records collection comprises one or more sub-period partitions, where each sub-period partition comprises unified records whose unified timestamp represents a time within a first predetermined time sub-period, each sub-period partition comprises one or more geohash partitions, where each geohash partition comprises unified records whose geohash value is in a predetermined range of geohash values, represented by a geohash range value, and each geohash partition comprises one or more subscriber partitions, where each subscriber partition comprises unified records having a common subscriber ID.

In another embodiment, a method for geographical searching, in a server computer, of a database of information relating to subscriber interactions with a telecommunication network is disclosed. The method comprises receiving, by the server computer from an authorized user of the server computer, a search request comprising a geohash value of a geographical location of a center point of a search, a radius of the search, and a time period of the search; determining, by the server computer, a first geohash prefix value representing a first corner of a search rectangle that includes geohash values within the radius from the geohash value of the center point; determining, by the server computer, a second geohash prefix value representing a second corner of the search rectangle, where the second corner is diagonally opposite the search rectangle from the first corner; finding, by the server computer, one or more period partitions in a collection of unified records, wherein: each unified record relates to a transaction between a node of a telecommunications network and a subscriber of the telecommunications network, wherein the unified record comprises a timestamp, a subscriber identifier (ID), and a geohash value representing geographical information relating to the transaction, and the collection of unified records comprises one or more period partitions, each comprising one or more unified records whose timestamps represent a time during the time period of the search; finding, by the server computer, one or more geohash partitions in the one or more period partitions, where the one or more geohash partitions include unified records having a geohash value between the first and second geohash prefix values; finding, by the server computer, one or more target unified records in the one or more geohash partitions, where the geohash values of the one or more target unified records indicate a geographical location whose distance from the geohash value of the center point is less than the radius; and sending, by the server computer to the authorized user, a message comprising, for each of the one or more target unified records, the timestamp, the subscriber ID, and geographical information relating to the geohash value of the target unified record.

In yet another embodiment, a method for searching, in a server computer, a collection of information relating to subscriber interactions with a telecommunication network to find a geographical location of a subscriber device is disclosed. The method comprises receiving, by the server computer from an authorized user of the server computer, a search request comprising a target subscriber identifier (ID); searching, by the server computer, for a search result unified record in a collection of unified records, wherein: each unified record in the collection of unified records relates to a transaction between a node of a telecommunications network and a subscriber of the telecommunications network, the unified record comprising a timestamp, a subscriber ID, and a geohash value representing geographical information relating to the transaction, the collection of unified records comprises one or more period partitions comprising one or more unified records whose timestamps represent a time during a first predetermined time period, each period partition comprises one or more sub-period partitions comprising the unified records whose timestamps represents a time within a second predetermined time period, the second predetermined time period being shorter than the first predetermined time period, each sub-period partition comprises one or more subscriber partitions comprising unified records having a common subscriber ID, searching for a target unified record in a collection of unified records comprises (i) searching the sub-period partitions, starting with a most recent time period, for a search result subscriber partition having unified records with the target subscriber ID and (ii) searching the search result subscriber partition for a search result unified record having a most recent timestamp; and sending, by the server computer to the authorized user, a message comprising search result information relating to a result of the search for the search result unified record.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A is a block diagram of an example provider transaction record.

FIG. 2B is a block diagram of a first period records collection according to an embodiment of the disclosure.

FIG. 2C is a block diagram of a unified record according to an embodiment of the disclosure.

FIG. 2D is a block diagram of a first period unified records collection according to an embodiment of the disclosure.

FIG. 4 is a flow chart of a second method according to an embodiment of the disclosure.

FIG. 5 is a flow chart of a third method according to an embodiment of the disclosure.

DETAILED DESCRIPTION

Figure 1:
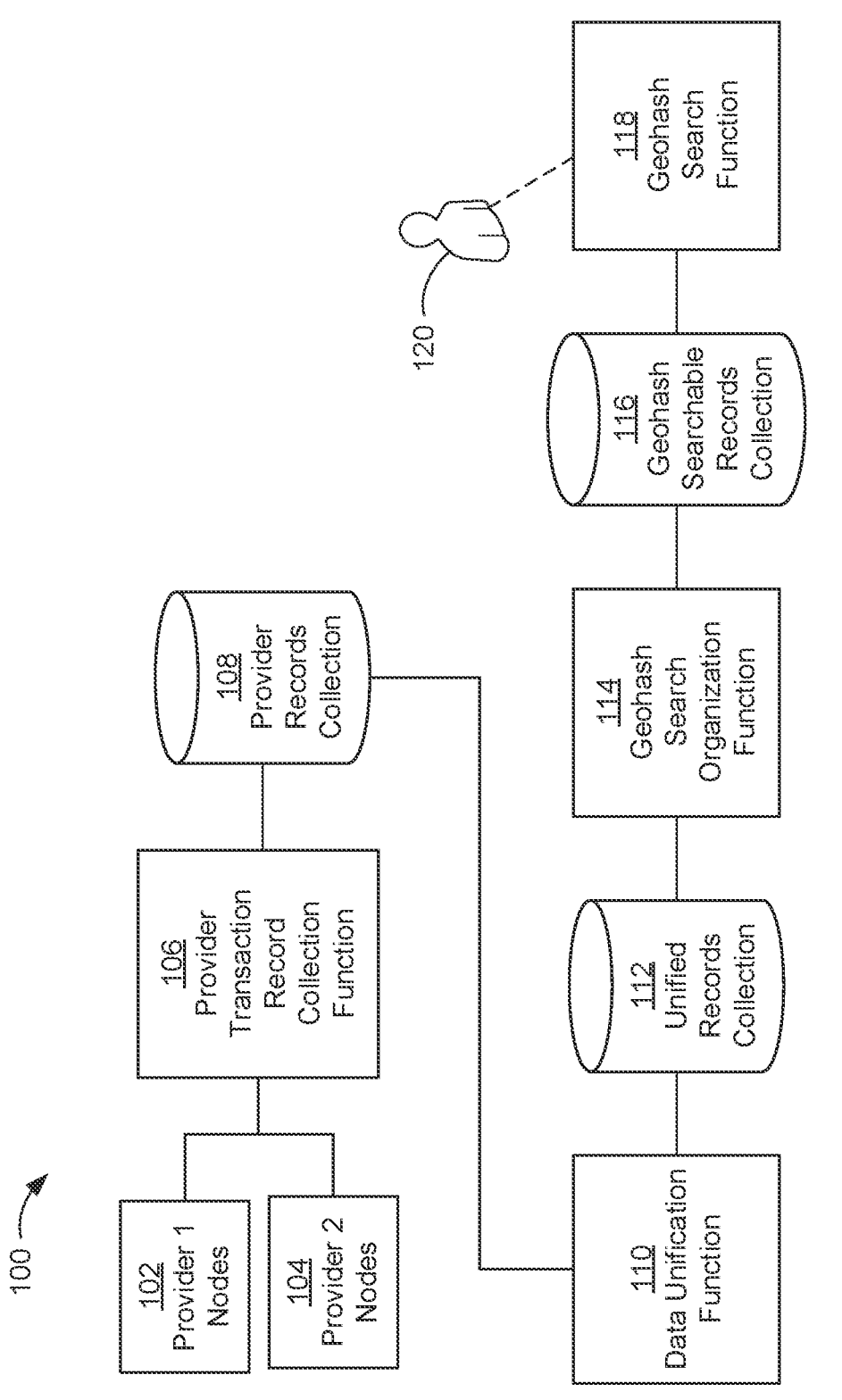
FIG. 1 is a block diagram of a first communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Currently, subscriber interaction information between subscriber mobile devices and elements of a telecommunication network (network elements) is collected by network providers from their cell towers or cell tower clusters. Such network providers may include common carriers, broadband Internet access providers, and wireless Voice over Internet Protocol (VoIP) service providers. Such interaction information may include identifiers (IDs) of the subscriber's mobile device and the provider involved in the interaction; a timestamp of the interaction; for cellular devices, the cell tower being used by the target phone; and a location of the mobile device relative to the cell tower. The mobile device ID may be converted into a subscriber ID and the location into a latitude and longitude (lat/long) value. The interaction information is collected by network providers from their cell towers or clusters of their cell towers.

Thus, as initially collected, the information collected is segregated by provider and may be grouped by cell tower or cell tower cluster. The information includes data the network provider deems useful and the collected data may change as the providers' needs change.

The information may include information that a searcher considers irrelevant to a geographical search of interactions.

Subscriber mobile devices may interact with multiple providers when accessing different services and when moving geographically, resulting in a large amount of data being collected relative to each mobile device. The number of mobile devices in use with network providers has grown and will continue to grow. As such, a searcher faces multiple technological problems in attempting to perform a geographical search of subscriber interactions by specific mobile devices with multiple network providers.

Methods and systems according to the disclosure for performing a geographical search of mobile device network interactions provide a technological solution to such problems by being configured to process a large amount of data (in some cases, terabytes of data per day) collected from multiple network elements (in some cases, on the order of 200+ network elements). The methods and systems convert the interaction information collected from network providers into transaction records that are adapted for geographical searching. Interaction information may be collected from network providers and converted into transaction records periodically throughout the day to reduce the amount of processing needed for each period.

Such conversion includes discarding some portions of the data collected by network providers as unneeded for geographical searching or for presenting the results of such a search. Latitude and longitude (lat/long) values of the provider information are converted to a geohash value that provides each data entry with a location value that is highly precise and easy to search. Storage of the transaction records in a server computer is partitioned based on their geohash values, which speeds access to the geohash partitions that include transaction records within or near a designated search location (or center) and radius, thus enabling the search to be limited to only such geohash partitions. This enables faster searching for transactions occurring within a specified geographical region.

Similarly, storage of the transaction records in a server computer is partitioned based on their time of collection (for example by day and by hour), speeding access to the time partitions that include transaction records within or near the specified time period for the search, thus enabling the search to be limited to only such time partitions. This enables faster searching for transactions occurring within a specific time range.

Methods and systems according to the disclosure for performing a geographical search of mobile device network interactions provide a further technological solution to problems discussed above by limiting transaction searching to a designated location and radius around the designated location. The designated location may be converted into a geohash value and used in combination with the radius to determine geohash values (or geohash prefix values) of corners of a search rectangle that includes geohash values within the radius from the geohash value of the designated location.

A geohash value encodes a geographic location into a string of alphanumeric characters. A first, leftmost character identifies a location within one of thirty-two large rectangular areas on the surface of the Earth. A second character identifies one of thirty-two smaller rectangular areas that subdivide the rectangular area identified by the first character. Further characters may be added, as needed, to identify smaller and smaller rectangular areas until a desired precision of encoding is achieved for a final, full geohash value. The leftmost characters of a geohash value may be referred to as a "prefix" of the geohash value. From the description above, it may be seen that geohash values with the same prefix (referred to herein as a "common prefix") are within the rectangular area identified by the geohash value of the prefix. A longer prefix identifies a smaller rectangular area than a shorter prefix.

Methods and systems according to the disclosure provide a further technological solution to the problems discussed above by taking advantage of the characteristics of geohash encoding to more quickly determine whether a transaction record is within a search circle defined by the designated search location and radius. Firstly, as described above, only geohash partitions that are within or near a designated search location (or center) and radius will be searched. Secondly, methods according to the disclosure calculate geohash prefix values of opposing corners of a search rectangle that encloses the circle. Such corner prefix values define a lower bound and an upper bound on full geohash values that are within the search circle. One or more additional characters may be added to the lower corner prefix value to define sub-rectangle prefixes within the search rectangle.

Prior to beginning the search of the search rectangle, such sub-rectangle prefixes may be separated into those identifying sub-rectangles that contain geohash values that are outside, inside, or both outside and inside ("crossing") the search circle. This allows the full geohash value of a transaction record to be more quickly evaluated as being inside or outside of the search circle. Transaction records having a geohash value prefix that matches an "outside" or "inside" sub-rectangle prefix can be classified without further evaluation as being outside or inside the search circle. Only transaction records having a sub-rectangle prefix matching a "crossing" sub-rectangle prefix require further processing to determine whether they are within the search circle.

In a first example of use, a subscriber may have lost their mobile device and contacted their network provider for help finding it. The network provider collects information on the subscriber's identity (e.g., a subscriber ID) and the last known time and location of the mobile device. Then, using a system or method according to the disclosure, the network provider performs a search for the mobile device. Such a search may be iterative, searching progressively larger geographic areas and/or longer time periods until the mobile device is found or the search is deemed to be unsuccessful.

In a second example of use, a sheriff's department or other authorized agency may be looking for a hiker who's been reported missing and contact a network provider for help finding the person. The network provider collects information on the hiker's subscriber ID and last known time and location. Then, using a system or method according to the disclosure, the network provider performs a search for one or more mobile devices associated with the hiker's subscriber ID. Again, such a search may be iterative in geographic area and/or time period until the hiker's mobile device is found or the search is deemed to be unsuccessful.

In a third example of use, when one or more local businesses are experiencing a series of burglaries, a local police department may suspect that a criminal group is involved in all the crimes. The police department may contact a network provider, specifying regions around the locations of the burglaries and time periods related to the crimes, asking for a list of all mobile devices with transaction records in the specified regions during the specified time periods. Using a system or method according to the disclosure, the network provider performs a search for mobile devices that meet the police department's criteria and provides the results as a list of mobile devices and their associated subscriber IDs.

Turning now to FIG. 1, a communication system 100 according to the disclosure is described. FIG. 1 is a block diagram of a first communication system 100 according to an embodiment of the disclosure. Provider nodes 102 and 104 are network towers or other nodes belonging to one or more network providers. Such provider nodes may consolidate information from multiple network towers. Provider nodes 102 and 104 send provider transaction records to a provider transaction record collection function 106, which may execute on a server computer. In some embodiments, the provider transaction record collection function 106 requests provider transaction records from one or both of the provider nodes 102 and 104.

The provider transaction records include information such as a timestamp, a subscriber identifier (ID) that identifies a subscriber of the network, and geographical information that relate to an individual transaction between a node of a telecommunications network and the subscriber. Different network providers may format such information in different ways and may provide additional information in their transaction records.

The provider transaction record collection function 106 stores provider transaction records that are received during a first predetermined time period in a provider records collection 108. The provider records collection 108 may be referred to as a first period provider records collection. In some embodiments, the first predetermined time period is one hour and the provider transaction records in the provider records collection 108 have timestamps representing a time within a single hour. In some embodiments, the provider records collection 108 is a file comprising only provider transaction records having timestamps within a single time period. In other embodiments, the provider records collection 108 is a file comprising provider transaction records having timestamps within a plurality of time periods, partitioned by time period. In various embodiments, the first predetermined time period may be any desired period of time longer or shorter than one hour, e.g., thirty minutes, three hours, or twelve hours.

A data unification function 110 reads provider transaction records from the provider records collection 108, converts each provider transaction record into a corresponding unified record having a unified transaction record format, and stores the unified records into a unified records collection 112. The data unification function 110 executes on a server computer. In various embodiments, the data unification function 110 and the provider transaction record collection function 106 execute on the same or on different server computers.

The unified records collection 112 includes unified records corresponding to all provider transaction records in the provider records collection 108. The unified records collection 112 may be referred to as a first period unified records collection. As described for the provider records collection 108, the unified records collection 112 is a file comprising only unified records from a single time period. In other embodiments, the unified records collection 112 is a file comprising unified records from a plurality of time periods, partitioned by time period. Again, in various embodiments, the time period of the unified records collection 112 may be any desired period of time, e.g., thirty minutes, one hour, three hours, or twelve hours. The time period of the unified records collection 112 may be the same as, longer, or shorter than the time period of the provider records collection 108.

Information in a provider transaction record is converted into a unified record format, as needed, from a format used by an originating network provider for its transaction records. Each unified record comprises a geohash value, a unified timestamp, and a unified subscriber ID representing, respectively, the geographical information, the timestamp, and the subscriber ID of the corresponding provider transaction record. In various embodiments, unified records may include other fields converted from information in the corresponding provider transaction records. Some information in the provider transaction records may not be converted and stored by the data unification function 110.

A geohash search organization function 110 reads unified records from the unified records collection 112 and stores the unified records into a geohash searchable records collection 116. The geohash searchable records collection 116 is configured for geographical searching and comprises unified records received during a second predetermined time period, where the second predetermined time period is longer than the first predetermined time period. The geohash searchable records collection 116 may be referred to as a second period unified records collection. In some embodiments, the second predetermined time period is one day.

The geohash searchable records collection 116 comprises one or more sub-period partitions, where each sub-period partition comprising unified records whose unified timestamp represents a time within the first predetermined time sub-period. Each sub-period partition comprises one or more geohash partitions, where each geohash partition comprises unified records whose geohash value is in a predetermined range of geohash values. Each geohash partition comprises one or more subscriber partitions, where each subscriber partition comprises unified records having a common subscriber ID.

In some embodiments, the predetermined range of geohash values comprises a geohash values having a common prefix of a predetermined length. In various embodiments, the unified subscriber ID comprises an international mobile subscriber identity (IMSI) or other ID format suitable for unambiguously identifying subscribers from a plurality of network providers. In some embodiments, the sub-period partitions of the geohash searchable records collection 116 are sorted by time period, the geohash partitions of a sub-period partition are sorted by geohash value, the subscriber partitions of a geohash partition are sorted by unified subscriber ID, and the unified records of a subscriber partition are sorted by unified timestamp.

A geohash search function 118 is configured to read unified records from the geohash searchable records collection 116 and to send and receive messages to an authorized user 120. Because the geohash searchable records collection

116 comprises privileged information, the authorized user 120 is typically authorized by the service provider or network administrator to use the geohash search function 118. It is understood, in an embodiment, unauthorized users are not granted access to use the geohash search function 118. The geohash search function 118 executes on a server computer, which in various embodiments may be the same or different server computer than the server computer(s) on which the data unification function 110 and the provider transaction record collection function 106 execute. As described in more detail with reference to FIGS. 4 and 5, the authorized user 120 sends a search request to the geohash search function 118, the search request comprising search parameters. In response, the geohash search function 118 performs the requested search of the geohash searchable records collection 116 according to the search parameters and sends one or more messages to the authorized user 120 comprising results of the search.

FIG. 2A is a block diagram of an example provider transaction record 200. The provider transaction record 200 includes a provider ID that identifies the network provider from which the record was received. The provider transaction record 200 further includes a provider subscriber ID, other provider data, a provider timestamp, and a latitude/longitude (lat/long) of the transaction, in formats defined by the provider. The other provider data may include a type of communication service (e.g., internet, voice, VOIP) used in the transaction, a volume of network throughput for the subscriber or network facility at the time of the transaction, or other data selected by the provider.

FIG. 2B is a block diagram of a first period provider records collection 210 according to an embodiment of the disclosure. The first period provider records collection 210 is an embodiment of the provider records collection 108 described above with reference to FIG. 1. In this embodiment, the first period is one hour and the first period provider records collection 210 comprises provider transaction records having timestamps within a single hour. The hour is represented by an hour timestamp included in the first period provider records collection 210. In other embodiments, the first period may be longer or shorter than one hour, e.g., one-half hour, twelve hours, or another suitable period of time. The first period provider records collection 210 further includes provider transaction record 200*a*, provider transaction record 200*b*, and may include additional provider transaction records.

FIG. 2C is a block diagram of a unified record 220 according to an embodiment of the disclosure. The unified record 220 includes information from a corresponding provider transaction record 200, converted into a corresponding unified format. The unified record 220 includes a geohash (or unified lat/long), a unified timestamp, and a unified subscriber ID converted, respectively, from the lat/long, the provider timestamp, and the provider subscriber ID of the corresponding provider transaction record 200. In some embodiments, the provider timestamp and/or the provider subscriber ID of the corresponding provider transaction record 200 may already be in the format used in the unified record 220 and require no conversion. In various embodiments, the unified record 220 may include additional information not shown in FIG. 2C.

FIG. 2D is a block diagram of a first period unified records collection 230 according to an embodiment of the disclosure. The first period unified records collection 230 is an embodiment of the unified records collection 112 described above with reference to FIG. 1. In this embodiment, the first period is one hour and the first period unified records collection 230 comprises provider transaction records having timestamps within a single hour. The hour is represented by an hour timestamp included in the first period unified records collection 230. In many embodiments, the period of the first period unified records collection 230 matches the period of the first period provider records collection 210. However, in other embodiments the two periods may be different. The first period unified records collection 230 further includes unified record 200*a*, unified record 200*b*, unified record 200*c*, and may include additional unified records.

Figure 2E:
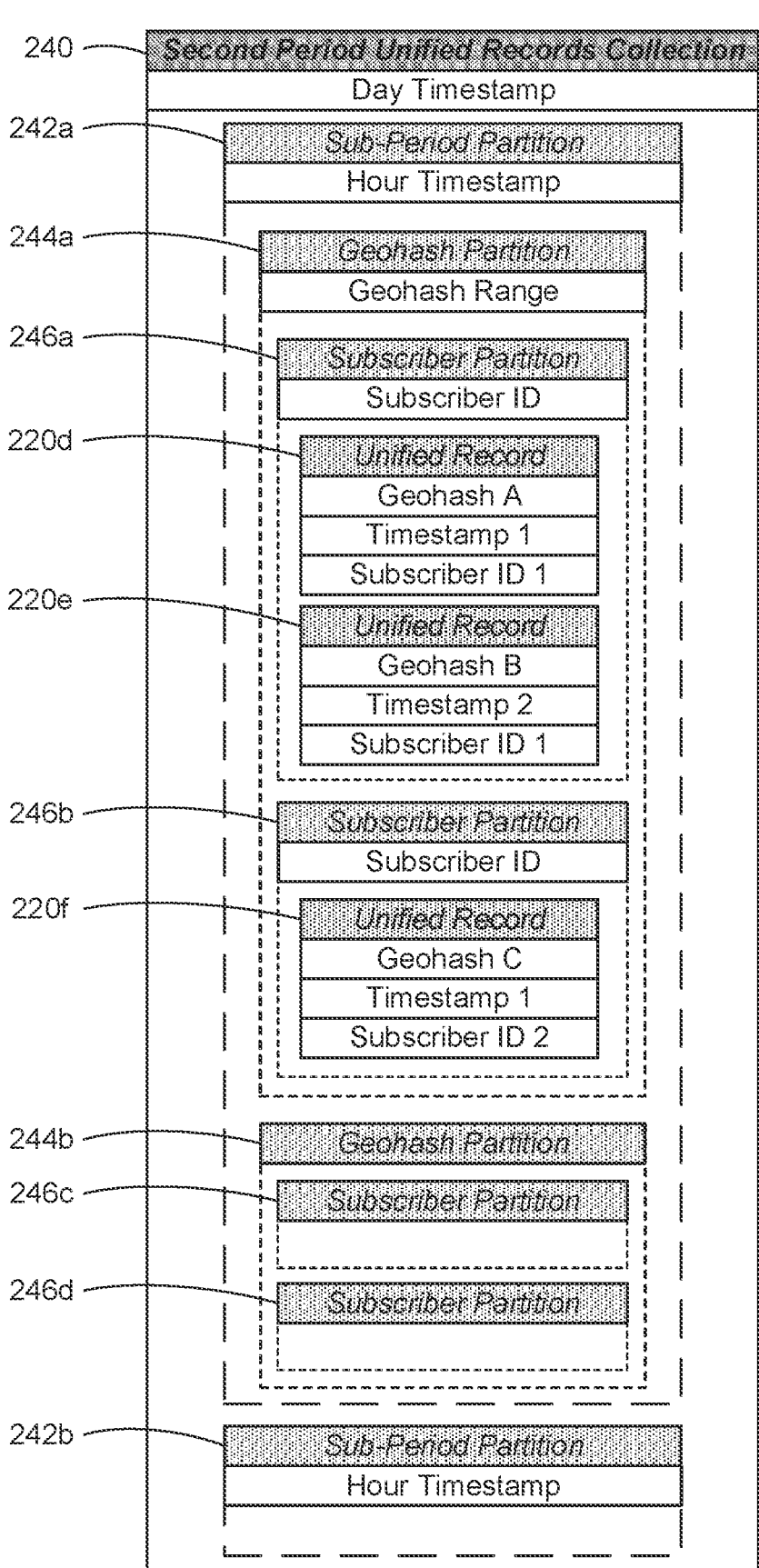
FIG. 2E is a block diagram of a second period unified records collection according to an embodiment of the disclosure.

FIG. 2E is a block diagram of a second period unified records collection 240 according to an embodiment of the disclosure. The second period unified records collection 240 is an embodiment of the geohash searchable records collection 116 described above with reference to FIG. 1. In this embodiment, the first period is a day and the second period unified records collection 240 comprises unified records having timestamps within a single day. The day of the unified records in the second period unified records collection 240 is represented by a day timestamp field of the second period unified records collection 240. In other embodiments, the first period may be a shorter or longer period than one day, e.g., twelve hours, one week, or another suitable period of time. The second period unified records collection 240 further includes a sub-period partition 242*a*, a sub-period partition 242*b*, and may include additional sub-period partitions 242.

The sub-period partition 242*a* comprises a geohash partition 244*a*, a geohash partition 244*b*, and may include additional geohash partitions 244. The geohash partition 244*a* comprises unified records whose geohash value is in a predetermined first range of geohash values (or first geohash range). The geohash range of the unified records in the geohash partition 244*a* is represented by the value of a geohash range field of the geohash partition 244*a*. The geohash partition 244*b* is similarly arranged, comprising unified records whose geohash value is in a second geohash range, which is represented by the value of the geohash range field of the geohash partition 244*b*.

The geohash partition 244*a* includes a subscriber partition 246*a*, a subscriber partition 246*b*, and may include additional subscriber partitions 246. The subscriber partition 246*a* comprises one or more unified records having a first subscriber ID. The subscriber ID of the unified records in the subscriber partition 246*a* is represented by the value of a subscriber ID field of the subscriber partition 246*a*. The subscriber partition 246*b* is similarly arranged, comprising unified records having a second subscriber ID, which is represented by the value of the subscriber ID field of the subscriber partition 246*b*.

Figure 2F:
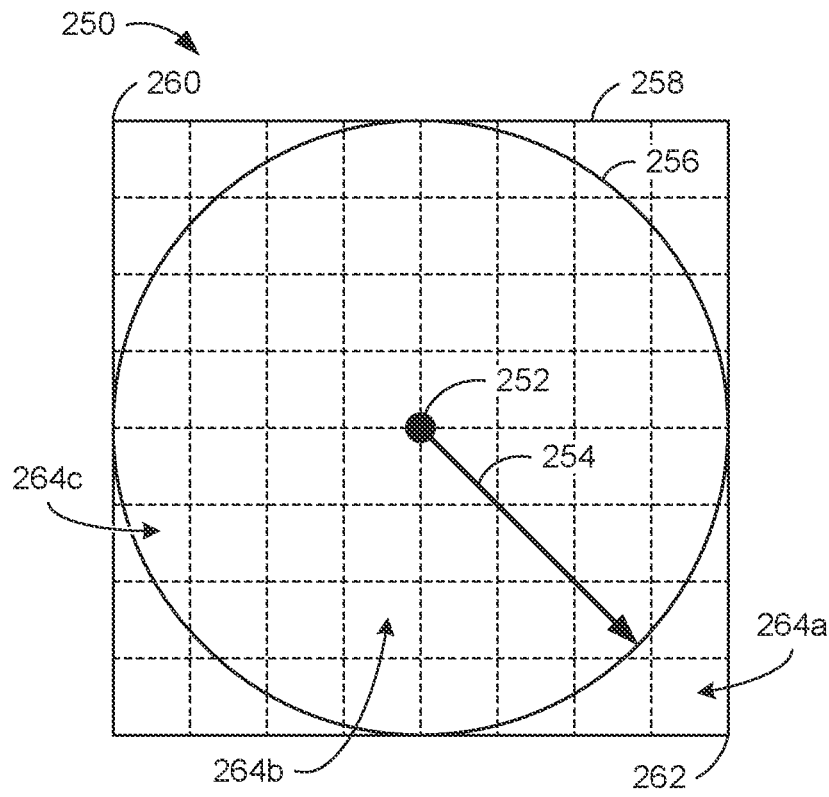
FIG. 2F is a graphical representation of an example geohash search according to an embodiment of the disclosure.

FIG. 2F is a graphical representation 250 of an example geohash search according to an embodiment of the disclosure. A search request includes a geohash value of a geographical location of a center point 252 of a search and a radius 254 of the search. Together, the geohash values of the center point 252 and the radius 254 define a search circle 256 and a search rectangle 258. The search rectangle 258 includes a first corner having first geohash prefix value 260 and a second corner having second geohash prefix value 262. The second geohash prefix corner 262 is diagonally opposite the search rectangle 258 from the first geohash prefix value 260. The number of geohash characters (or length L) of the first geohash prefix value 260 is the same as the length of the second geohash prefix value 262.

A method according to an embodiment of the disclosure is configured to determine whether unified records in a geohash partition 244 are within the search circle 256 by comparing a value of a prefix of the geohash range field of the geohash partition 244 to the first geohash prefix value 260 and the second geohash prefix value 262. If the geohash range field prefix value is between the first geohash prefix value 260 and the second geohash prefix value 262, then the unified records of the geohash partition 244*b* may be within the search circle 256.

Adding an additional character to the first geohash prefix value 260 subdivides the search of the search rectangle 258 into search sub-rectangles 264 having geohash prefix values of length L+1. The sub-rectangles 264 may be separated into sets that are outside (e.g., 264*a*), inside (e.g., 264*b*), or crossing (e.g., 264*c*) the search circle 256. Such separation into sets may be performed before the search process begins, to speed the search process. Geohash partitions 244 having an L+1 length geohash range field prefix that is in the 'outside' set will not have unified records within the search circle 256, those with a prefix that is in the 'inside' set will have unified records within the search circle 256, and the unified records of geohash partitions 244 in the 'crossing' set will be examined individually to determine whether they are within the search circle 256.

In some cases, the search rectangle 258 may include geohash values having different leftmost characters. That is, the first corner and the second corner of the search rectangle 258 do not have a common geohash prefix value. In such cases, determining whether a unified record is within the search circle 256 may include (i) converting the geohash value of the center point of the search to a first latitude and longitude, (ii) converting the geohash value of a unified record to a second latitude and longitude, and (iii) determining whether a distance between the first latitude and longitude and the second latitude and longitude is less than the radius.

Figure 3:
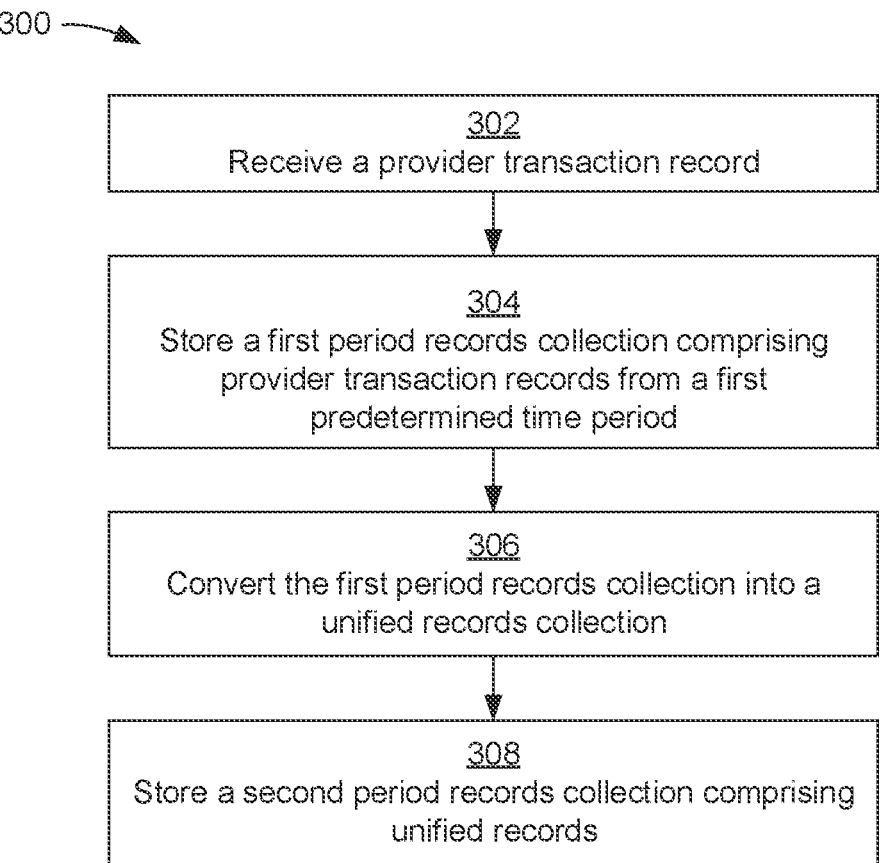
FIG. 3 is a flow chart of a first method according to an embodiment of the disclosure.

FIG. 3 is a flow chart of a first method 300 according to an embodiment of the disclosure. The method 300 is described as though performed within the communication system 100, but may be performed in other systems in other embodiments of the disclosure. The method 300 is a method for a server computer to create, or provide, a database of information that relates to subscriber interactions with a telecommunication network. The database is configured for geographical searching. In step 302, the server computer (e.g., the server computer executing the provider transaction record collection function 106) receives a provider transaction record. The provider record relates to an individual transaction between a node of a telecommunications network and a subscriber of the network. The provider record includes at least a timestamp, a subscriber ID, and geographical information relating to the transaction. Provider records from a first network provider may have a different format (e.g., arrangement and/or representation of data) than provider records from a second network provider.

In step 304, the server computer stores one or more provider records in a first period provider records collection (e.g., the provider records collection 108). The first period provider records collection comprises provider records having timestamps representing a time within a first predetermined time period. In step 306, the server computer (e.g., the server computer executing the data unification function 110) converts the first period provider records collection into a first period unified records collection (e.g., the unified records collection 112). The first period unified records collection comprises unified records that have a unified transaction record format. Each unified record comprises a geohash value, a unified timestamp, and a unified subscriber ID that represent, respectively, the geographical information, the timestamp, and the subscriber ID of a corresponding provider record from the first period provider records collection.

In step 308, the server computer (e.g., the server computer executing the geohash search organization function 114) stores a second period unified records collection (e.g., the geohash searchable records collection 116) comprising unified records received during a second predetermined time period, wherein the second predetermined time period is longer than the first predetermined time period. The second period unified records collection comprises one or more sub-period partitions, where each sub-period partition comprises unified records whose unified timestamp represents a time within a first predetermined time sub-period. Each sub-period partition comprises one or more geohash partitions, where each geohash partition comprises unified records whose geohash value is in a predetermined range of geohash values. Each geohash partition comprises one or more subscriber partitions, where each subscriber partition comprises unified records having a common subscriber ID.

In some embodiments, the first predetermined time period is one hour, the second predetermined time period is one day, and the first predetermined time sub-period is one hour. In various embodiments, the predetermined range of geohash values comprises geohash values having a common prefix of a predetermined length.

In some embodiments, the unified subscriber ID of a unified record comprises an international mobile subscriber identity (IMSI). In various embodiments, the sub-period partitions within the second period unified records collection are sorted by time sub-period, the geohash partitions within the sub-period partition are sorted by the geohash range value, the subscriber partitions within the geohash partition are sorted by unified subscriber ID, and the unified records within the subscriber partition are sorted by unified timestamp.

FIG. 4 is a flow chart of a second method 400 according to an embodiment of the disclosure. The method 400 is described as though performed within the communication system 100, but may be performed in other systems in other embodiments of the disclosure. The method 400 is a method for a server computer (e.g., the server computer executing the geohash search function 118) to search geographically a database of information relating to subscriber interactions with a telecommunication network (e.g., the geohash searchable records collection 116). In step 402, the server computer receives, from the authorized user 120, a search request that includes a geohash value of a geographical location of a center point of the search, a radius of the search, and a time period of the search. As described in the third example of use described above, such a search may be requested by a local police department when one or more local businesses are experiencing a series of burglaries.

In step 404, the server computer determines a first geohash prefix value that represents a first corner of a search rectangle that includes geohash values within the radius from the center point geohash value. In step 406, the server computer determines a second geohash prefix value that represents a second corner of the search rectangle, where the second corner is diagonally opposite the search rectangle from the first corner.

In step 408, the server computer finds one or more period partitions in a collection of unified records. Each unified record relates to an individual transaction between a node of a telecommunications network and a subscriber of the network. Each unified record comprises a timestamp, a subscriber ID, and a geohash value that represents geographical information relating to the corresponding transaction. The one or more period partitions found in step 408 comprise unified records whose timestamps represent a time during the time period of the search. In step 410, the server computer finds one or more geohash partitions in the one or more period partitions found in step 408, where the one or more geohash partitions found in step 410 include unified records having a geohash value between the first and second geohash prefix values.

In step 412, the server computer finds one or more target unified records in the one or more geohash partitions found in step 410, where the target unified records found in step 412 have a geohash value that indicates a geographical location whose distance from the center point geohash value that is less than the radius. In step 414, the server computer sends a message to the authorized user 120, the message comprising, for each of the one or more target unified records found in step 412, the timestamp, the subscriber ID, and geographical information relating to the geohash value of the target unified record.

In some embodiments, the one or more period partitions comprise unified records whose timestamp represents a time during one hour, where the hour is included, at least in part, in the time period of the search. In some embodiments, finding one or more unified records in the one or more geohash partitions comprises finding one or more unified records having a geohash prefix value that is greater than or equal to the first geohash prefix value and less than or equal to the second geohash prefix value. In some such embodiments, finding one or more unified records in the one or more geohash partitions further comprises (i) converting the geohash value of the center point of the search to a first latitude and longitude, (ii) converting the geohash value of a unified record to a second latitude and longitude, and (iii) determining whether a distance between the first latitude and longitude and the second latitude and longitude is less than the radius.

Multiple period partitions may be found in step 408 that include unified records whose timestamps represent a time during the time period of the search. If so, all such period partitions are searched in step 410. Similarly, multiple geohash partitions may be found in step 410 that include unified records having a geohash value between the first and second geohash prefix values. If so, all such geohash partitions are searched in step 412. In some embodiments, the search rectangle is a square.

FIG. 5 is a flow chart of a third method 500 according to an embodiment of the disclosure. The method 500 is described as though performed within the communication system 100, but may be performed in other systems in other embodiments of the disclosure. The method 500 is a method for a server computer (e.g., the server computer executing the geohash search function 118) to find a geographical location of a subscriber device. In step 502, the server computer receives, from the authorized user 120, a search request that includes a target subscriber ID.

As described in the first example of use described above, such a search may be requested by a subscriber who has lost their mobile device. Similarly, as in the second example of use described above, such a search may be requested by a sheriff's department or other authorized agency that is looking for a hiker who's been reported missing In step 504, the server computer searches for a search result unified record in a collection of unified records (e.g., the geohash searchable records collection 116). Each unified record relates to an individual transaction between a node of a telecommunications network and a subscriber of the network. Each unified record comprises a timestamp, a subscriber identifier, and a geohash value that represents geographical information relating to the corresponding transaction. The collection of unified records comprises one or more period partitions, each period partition comprising one or more unified records whose timestamps represent a time during an individual first predetermined time period. That is, the time period for a first period partition is different than the time period for a second period partition. Each period partition comprises one or more sub-period partitions, each sub-period partition comprising the unified records whose timestamps represents a time within an individual second predetermined time period, the second predetermined time period being shorter than the first predetermined time period.

Each sub-period partition comprises one or more subscriber partitions comprising unified records having a common subscriber ID. Searching for the search result unified record in the collection of unified records in step 504 further comprises the server computer (i) searching the sub-period partitions, starting with the most recent time period, for a search result subscriber partition that has unified records with the target subscriber ID and (ii) searching the search result subscriber partition for a search result unified record having a most recent timestamp.

In some embodiments, the search request received in step 502 may specify a time period for the search. In such embodiments, in step 504, the server computer searches period partitions and/or sub-period partitions having unified records with timestamps representing a time within the specified time period.

In some embodiments, the first predetermined time period is one day and the second predetermined time period is one hour. In some embodiments, the period partitions of the collection are sorted according to the timestamps of the unified records included therein, from oldest to most recent, and the sub-period partitions of each period partition are sorted according to the timestamps of the unified records included therein, from oldest to most recent.

In step 506, the server computer sends to an authorized user 120 a message that includes search result information relating to a result of the search in step 504 for the search result unified record. The search result information may indicate that no unified record was found with the target subscriber ID. However, in some embodiments, where the search result unified record is found, the search result information includes (i) the timestamp of the search result unified record and (ii) geographical information relating to the geohash value of the search result unified record.

In some embodiments, the search request received in step 502 further comprises a geographical location of a center point of a search and a radius of the search. In such embodiments, in step 502 the server computer also determines a first geohash prefix value that represents a first corner of a search rectangle that includes geohash values within the radius from the center point geohash value and a second geohash prefix value representing a second, opposite corner of the search rectangle. In step 504 of such embodiments, searching the sub-period partitions comprises searching for the search result subscriber partition in geohash partitions of the sub-period partitions, where the geohash partitions include unified records having a geohash value between the first and second geohash prefix values, and the search result subscriber partition includes a geohash value indicating a geographical location whose distance from the center point geohash value that is less than the radius.

Figure 6:
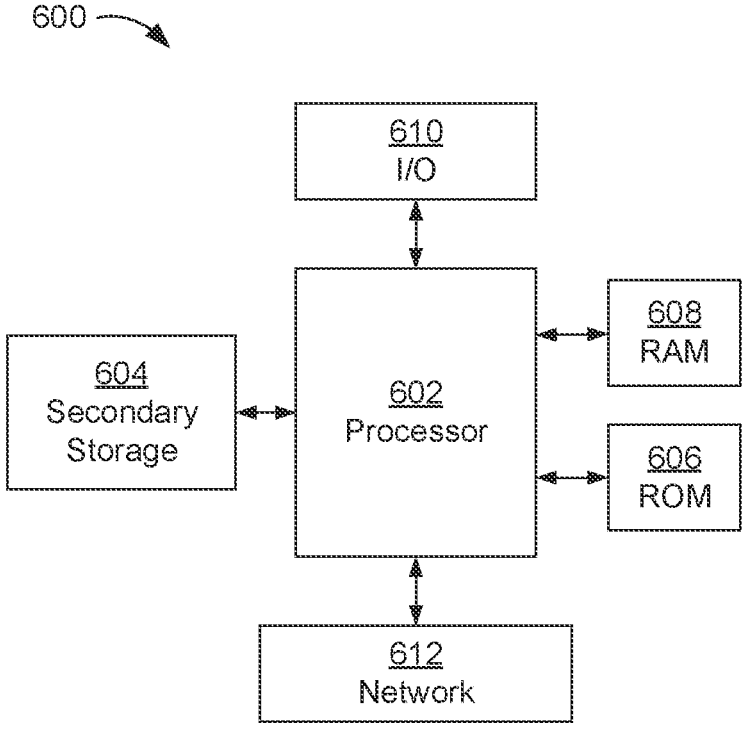
FIG. 6 is a block diagram of a hardware architecture of a device according to an embodiment of the disclosure.

FIG. 6 is a block diagram of a hardware architecture of a server computer 600 according to an embodiment of the disclosure. The server computer 600 may be suitable for implementing methods 300, 400 or 500. The server computer 600 includes a processor 602 (which may be referred to as a central processor unit or CPU) that is in communication with memory devices including secondary storage 604, ROM 606, and RAM 608. The processor 602 is also in communication with input/output (I/O) devices 610, and network connectivity devices 612. The processor 602 may be implemented as one or more CPU chips.

It is understood that by programming and/or loading executable instructions onto the server computer 600, at least one of the CPU 602, the RAM 608, and the ROM 606 are changed, transforming the server computer 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 606 or stored in the RAM 608. In some cases, on boot and/or when the application is initiated, the CPU 602 may copy the application or portions of the application from the secondary storage 604 to the RAM 608 or to memory space within the CPU 602 itself, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific purpose computer or a specific purpose machine.

The secondary storage 604 is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 may be faster than to secondary storage 604. The secondary storage 604, the RAM 608, and/or the ROM 606 may be referred to in some contexts as computer readable storage media and/or non-transitory computer readable media.

The processor 602 executes instructions, codes, computer programs, scripts which it accesses from the secondary storage 604, the ROM 606, or the RAM 608. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, the ROM 606, and/or the RAM 608 may be referred to in some contexts as non-transitory instructions and/or non-transitory information.

In some contexts, the secondary storage 604, the ROM 606, and the RAM 608 may be referred to as a non-transitory computer readable medium or a computer readable storage media. A dynamic RAM embodiment of the RAM 608, likewise, may be referred to as a non-transitory computer readable medium in that while the dynamic RAM receives electrical power and is operated in accordance with its design, for example during a period of time during which the server computer 600 is powered up and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for geographical searching, in a server computer, of a database of information relating to subscriber interactions with a telecommunication network, the method comprising:

receiving, by the server computer from an authorized user of the server computer, a search request comprising a geohash value of a geographical location of a center point of a search, a radius of the search, and a time period of the search, wherein the center point of the search and the radius of the search form a search circle centered on the center point of the search and having the radius of the search;

determining, by the server computer, a first geohash prefix value representing a first corner of a search rectangle that includes geohash values within the radius from the geohash value of the center point;

determining, by the server computer, a second geohash prefix value representing a second corner of the search rectangle, where the second corner is diagonally opposite the search rectangle from the first corner;

pre-classifying, by the server computer, geohash prefix values into sets comprising:

an outside set of geohash prefix values identifying sub-rectangles containing only geohash values outside the search circle;

an inside set of geohash prefix values identifying sub-rectangles containing only geohash values inside the search circle; and a crossing set of geohash prefix values identifying sub-rectangles containing geohash values both inside and outside the search circle;

finding, by the server computer, one or more period partitions in a collection of unified records, wherein:

each unified record relates to a transaction between a node of a telecommunications network and a subscriber of the telecommunications network, wherein the unified record comprises a timestamp, a subscriber identifier (ID), and a geohash value representing geographical information relating to the transaction, and the collection of unified records comprises one or more period partitions, each comprising one or more unified records whose timestamps represent a time during the time period of the search;

finding, by the server computer, one or more geohash partitions in the one or more period partitions, where the one or more geohash partitions include unified records having a geohash value between the first and second geohash prefix values;

finding, by the server computer, one or more target unified records in the one or more geohash partitions, where the geohash values of the one or more target unified records indicate a geographical location whose distance from the geohash value of the center point is less than the radius, wherein finding the one or more target unified records comprises:

classifying unified records having a geohash value with a prefix in the inside set as target unified records; and for unified records having a geohash value with a prefix in the crossing set, classifying unified records for which the geohash value indicates a geographical location having a distance from the geohash value of the center point less than the radius as target unified records; and sending, by the server computer to the authorized user, a message comprising, for each of the one or more target unified records, the timestamp, the subscriber ID, and geographical information relating to the geohash value of the target unified record.

2. The method of claim 1, wherein the one or more period partitions comprise unified records whose timestamp represents a time during one hour, where the hour is included, at least in part, in the time period of the search.

3. The method of claim 1, wherein finding one or more unified records in the one or more geohash partitions comprises finding one or more unified records having a geohash prefix value that is greater than or equal to the first geohash prefix value and less than or equal to the second geohash prefix value.

4. The method of claim 3, wherein finding one or more unified records in the one or more geohash partitions further comprises (i) converting the geohash value of the center point of the search to a first latitude and longitude, (ii) converting the geohash value of a unified record to a second latitude and longitude, and (iii) determining whether a distance between the first latitude and longitude and the second latitude and longitude is less than the radius.

5. The method of claim 1, wherein finding a period partition in a collection of unified records comprises finding a plurality of period partitions comprising unified records whose timestamps represent a time during the time period of the search.

6. The method of claim 1, wherein finding the one or more geohash partitions in the one or more period partitions comprises finding a plurality of geohash partitions that include unified records having geohash values between the first and second geohash prefix values.

7. The method of claim 1, wherein the search rectangle is a square.

8. The method of claim 1, wherein each unified record in the collection of unified records are based on a provider transaction record from a network provider of a plurality of network providers, and wherein the provider transaction record comprises a provider subscriber ID, a provider timestamp, and a latitude and longitude of the transaction.

9. The method of claim 8, wherein the collection of unified records are based on provider transaction records associated with the plurality of network providers.

10. The method of claim 9, wherein the collection of unified records comprise the provider transaction records converted to a unified format.

11. A method for searching, in a server computer, a collection of information relating to subscriber interactions with a telecommunication network to find a geographical location of a subscriber device, the method comprising:

receiving, by the server computer from an authorized user of the server computer, a search request comprising a target subscriber identifier (ID);

determining, according to the search request, a search circle defined by a center point and a radius;

pre-classifying, by the server computer, geohash prefix values into sets comprising:

an outside set of geohash prefix values identifying sub-rectangles containing only geohash values outside the search circle;

an inside set of geohash prefix values identifying sub-rectangles containing only geohash values inside the search circle; and a crossing set of geohash prefix values identifying sub-rectangles containing geohash values both inside and outside the search circle;

searching, by the server computer, for a search result unified record in a collection of unified records, wherein:

each unified record in the collection of unified records relates to a transaction between a node of a telecommunications network and a subscriber of the telecommunications network, the unified record comprising a timestamp, a subscriber ID, and a geohash value representing geographical information relating to the transaction, the collection of unified records comprises one or more period partitions comprising one or more unified records whose timestamps represent a time during a first predetermined time period, each period partition comprises one or more sub-period partitions comprising the unified records whose timestamps represents a time within a second predetermined time period, the second predetermined time period being shorter than the first predetermined time period, each sub-period partition comprises one or more subscriber partitions comprising unified records having a common subscriber ID, searching for a target unified record in a collection of unified records comprises:

searching the sub-period partitions, starting with a most recent time period, for a search result subscriber partition having unified records with the target subscriber ID; and searching the search result subscriber partition for a search result unified record having a most recent timestamp by:

classifying unified records having a geohash value with a prefix in the inside set as search result unified records; and for unified records having a geohash value with a prefix in the crossing set, classifying unified records for which the geohash value indicates a geographical location having a distance from the geohash value of the center point less than the radius as search result unified records; and sending, by the server computer to the authorized user, a message comprising search result information relating to a result of the search for the search result unified record.

12. The method of claim 11, wherein the search result unified record is found and the search result information comprises (i) the timestamp of the search result unified record and (ii) geographical information relating to the geohash value of the search result unified record.

13. The method of claim 12, wherein the first predetermined time period is a day and the second predetermined time period is one hour.

14. The method of claim 13, wherein:

the period partitions of the collection are sorted according to the timestamps of the unified records included therein, from oldest to most recent, and the sub-period partitions of each period partition are sorted according to timestamps of the unified records included therein, from oldest to most recent.

15. The method of claim 11, wherein the search request further comprises a geographical location of a center point of a search and a radius of the search, the method further comprising:

determining, by the server computer, a first geohash prefix value representing a first corner of a search rectangle that includes geohash values within the radius from the geohash value of the center point; and determining, by the server computer, a second geohash prefix value representing a second, opposite corner of the search rectangle, wherein searching the sub-period partitions comprises searching for the search result subscriber partition in geohash partitions of the sub-period partitions, wherein:

the geohash partitions include unified records having a geohash value between the first and second geohash prefix values, and the search result subscriber partition includes a geohash value indicating a geographical location whose distance from the geohash value of the center point is less than the radius.

16. The method of claim 15, wherein the search rectangle is a square.

17. The method of claim 11, wherein:

the search request further comprises a specified time period for the search; and searching the sub-period partitions comprises searching for the search result subscriber partition in sub-period partitions having unified records with timestamps representing a time within the specified time period.

18. The method of claim 11, wherein each unified record in the collection of unified records are based on a provider transaction record from a network provider of a plurality of network providers, and wherein the provider transaction record comprises a provider subscriber ID, a provider timestamp, and a latitude and longitude of the transaction.

19. The method of claim 18, wherein the collection of unified records are based on provider transaction records associated with the plurality of network providers.

20. The method of claim 19, wherein the collection of unified records comprise the provider transaction records converted to a unified format.

\* \* \* \* \*